3,424,737
PROCESS FOR THE POLYMERIZATION
OF OLEFINS
André Delbouille, Brussels, and Henry Toussaint, Schaerbeek, Brussels, Belgium, assignors to Solvay & Cie, a simple of the Kingdom of Belgium
No Drawing. Filed Oct. 2, 1964, Ser. No. 401,234
Claims priority, application France, Jan. 3, 1964, 959,308
U.S. Cl. 260—94.9                                    7 Claims
Int. Cl. C08f 1/28, 3/02; B01j 11/84

ABSTRACT OF THE DISCLOSURE

A process for polymerizing at least one 1-olefin such as ethylene with a catalyst which forms on comingling a sandwich compound such as bis(cyclopentadienyl) titanium chloride, a tin or lead compound such as tetrabutyl tin and a halide of aluminum or boron such as aluminum chloride.

---

This invention relates to catalysts which are useful for the polymerization and copolymerization of alpha olefins, especially ethylene.

It is known to utilize, for the polymerization of ethylene, or other alpha olefins, ternary catalysts formed from:

(a) A metal, a halide or an organometallic compound of a metal of Subgroup $b$ of Groups IV, V and VI of the Periodic Table [1];

(b) A halide of an element of Subgroup $a$ of Groups IV, V and VI; and (c) A halide of an element of Group III or V (Belgian Patent 547,618).

Ingredients (a) include the tetraalkyls and tetraaryls of tin and of lead, especially those containing up to 40 carbon atoms per molecule, e.g., tetraethyl lead, tetrapropyl lead, tetrabutyl lead, tetraphenyl lead, tetranaphthyl lead, and the corresponding compounds of tin. The tin tetraalkyls produce especially active catalysts.

Ingredients (b) include the mineral acid salts of titanium, vanadium, chromium, molybdenum, and tungsten, the halides of titanium being frequently used.

Ingredients (c) include the halides of aluminum, of antimony, and of boron. Especially suitable are aluminum trichloride, antimony pentachloride, and boron trifluoride. This ternary catalyst allows olefin polymers of high molecular weight to be obtained under favorable conditions and with very good productivity.

Such catalysts are, for example, formed as products of the reaction of a lead or a tin alkyl with titanium tetrachloride or a vanadium chloride in the presence of aluminum chloride or a halide of boron. Such catalysts promote the formation of linear polyethylenes having high molecular weight and a density of the order of 0.955.

An object of this invention is to provide an improved polymerization catalyst. Another object is to produce solid olefin polymers having improved properties. Other objects and advantages will become apparent to those skilled in the art on considering this disclosure.

It has now been discovered that the polymerization of ethylene and higher alpha-olefins can be effected by using a catalyst system obtained by the reaction of a metal, a halide or an organometal compound of Groups IV$b$, V$b$ and VI$b$ of the Periodic Table with a halide of an element of Group III or V and a "sandwich" compound of a transition element selected from Groups IV$a$, V$a$, VI$a$ and VIII of the Periodic Table, this compound being substituted for ingredient (b), supra.

[1] Lange, N. A., "Handbook of Chemistry," 4th ed., 1941, Sandusky, Ohio, Handbook Publishers, Inc., pages 18 and 19.

This process is particularly applicable to the polymerization of ethylene and higher olefins such as, for example, propylene, 1-butene, 1-pentene and 4-methyl-1-pentene. This list is not exhaustive. Furthermore, the process includes the copolymerization of ethylene with higher olefins or of the latter among themselves.

One advantageous method of carrying out the process of polymerization according to this invention comprises forming the catalyst by the reaction of an alkyl lead or an alkyl tin (alkyl groups having up to 10 carbon atoms each) and anhydrous aluminum chloride or an anhydrous boron halide with a "sandwich" compound of a transition metal such as titanium, vanadium, zirconium, chromium, cobalt, iron or nickel. The "sandwich" compounds which are preferred are, for example, the bis-cyclopentadienyl derivatives of these meals, especially the bis-cyclopentadienyl titanium chlorides, the bis-cyclopentadienyl vanadium chlorides, and bis-cyclopentadienyl vanadium oxychloride. Di-benzene chromium, di-toluene chromium, and bis-cyclopentadienyl cobalt are also operative.

The polymerization can be effected at temperatures in the range 0° to 100° C., pressures in the range 1 to 50 atmospheres, and reaction times in the range 15 minutes to 50 hours. These are not absolute limitations. Conditions outside these ranges can be used.

According to the invention, the polymerization can be conducted continuously or batchwise in homogeneous phase. Although all inert solvents are suitable, and particularly all the inert hydrocarbons, the best results are obtained when the catalyst is dissolved in an aromatic solvent. In general, the preferred solvents are benzene, toluene, the xylenes, and the like.

The product polymers obtained by the use of the catalysts hereinbefore described are formed in good yields, and the catalyst activity is optimum, when the molar ratio between the Group III or V element halide and the first constituent of the catalyst system, particularly the molar ratio between the aluminum compound and the tin or lead derivative, is within the range 0.1:1 to 2:1. In accordance with this invention, the molar ratio of Group III or V element halide to "sandwich" compound is usually in the range 1:1 to 5:1. Ratios outside this range are operative.

According to the process of this invention, polymers are obtained which have density and rigidity clearly superior to those of corresponding polymers obtained by processes known in the prior art. In fact, the polymer product obtained is essentially linear since it contains less than one methyl group per thousand carbon atoms. Furthermore, a significant difference in the number of carbon-carbon double bonds which are internal and terminal is observed. The result is an appreciable increase in the density and the crystallinity.

The high density of the polymer together with its high rigidity constitute an appreciable improvement, the advantage of which is evident in the fabrication of articles by injection. Injection molded articles do not exhibit distortions which are present in certain cases in similar articles injection molded utilizing polyethylenes known in the prior art.

The following examples are given as illustrative.

EXAMPLE I

The polymerization of ethylene is effected in the presence of a ternary catalyst $(C_5H_5)_2TiCl_2$-$Sn(C_4H_9)_4$-$AlCl_3$.

Into a one liter autoclave, 109 milligrams of bis-cyclopentadienyl titanium chloride and a homogeneous solution (concentration 200 grams per liter), in xylene, of a mixture of aluminum chloride and tetra(n-butyl) tin are introduced at a mol ratio of 0.475:0.525, respectively, the mol ratio of aluminum to titanium being 3.08:1. The catalyst system is homogenized by the addition of 100 cc. of benzene. The color of the resulting solution is green.

Before proceeding with the polymerization, one adds about 500 cc. of benzene. A partial pressure of ethylene of 9.04 kilograms per square centimeter (129 p.s.i.) is maintained in the autoclave together with a temperature of 25° C. After 180 minutes, the reaction is stopped and there is recovered 12 grams of polyethylene having a density (ASTM Methods D1248–60T and D1505–60T) of 0.959 gm./cc. and a molecular weight (based on viscosity measurement at 160° C. of the polymer dissolved in tetralin) of 52,000.

EXAMPLES II, III AND IV

The polymerization of ethylene according to Example I is repeated with different quantities of reagents. The results are shown in Table I.

TABLE I

| No. | $(C_5H_5)_2TiCl_2$, gm. | $AlCl_3$, gm. | $Sn(C_4H_9)_4$, gm. | $PC_2H^4$, kg./cm.$^2$ | (P.s.i.) | Duration, minutes | Grams polymer | Molecular weight based on viscosity |
|---|---|---|---|---|---|---|---|---|
| 2 | 0.110 | 0.122 | 0.338 | 8.6 | (122) | 199 | 12 | 108,000 |
| 3 | 0.127 | 0.194 | 0.606 | 7.3 | (104) | 210 | 19 | 72,000 |
| 4 | 0.116 | 0.146 | 0.984 | 7.7 | (110) | 150 | 13 | 51,000 |

EXAMPLE V

The catalyst is prepared by introducing 300 mg. of bis-cyclopentadienyl titanium chloride into a 250 cc. cylinder which is dry and has been swept out with nitrogen. After dissolution in 100 cc. of benzene, there is added 3.83 grams of a homogeneous solution of aluminum chloride and tetra(n-butyl) tin in a mole ratio of 0.475:0.525, respectively. The catalyst is allowed to age for 15 minutes at room temperature.

The catalyst system is introduced into a stainless steel autoclave which has a three-liter capacity, is dry, and has been swept out with nitrogen and which contains 900 cc. of pure benzene. After introduction into the autoclave the catalyst dissolves totally and a greenish color appears.

Polymerization is effected at 25° C. for 235 minutes at an average ethylene pressure of 11.5 kilograms per square centimeter (164 p.s.i.). After cessation of the polymerization, 33 grams of polyethylene is obtained having a molecular weight (based on viscosity) of 27,000, a density of 0.967 gm./cc. and a modulus of rigidity in torsion, expressed as the quantity G of 260 kilograms per square centimeter (3700 pounds per square inch) (ASTM D1043–61T), under constant maximum tension. In Table II these values are compared with those of a polyethylene of similar molecular weight prepared by the use of a ternary catalyst in accordance with the prior art (Belgian Patent 547,618).

TABLE II

| Material | Density, gm./cc. | G, kg./cc., 100° C. | (P.s.i.) |
|---|---|---|---|
| Example 5 | 0.967 | 260 | (3,700) |
| Polyethylene 1[1] | 0.954 | 120 | (1,710) |

[1] Polyethylene 1 was produced with a catalyst prepared from titanium tetrachloride, tin tetra(n-butyl) and aluminum chloride according to Belgian Patent 547,618.

The data in Table II show that the rigidity of the polyethylene produced according to this invention is clearly higher to that of polymers previously produced with other catalysts.

Polyethylene prepared according to the process of this invention is characterized by a particular structure and especially by exceptional linearity.

Shown in Table III are values of density of different samples of polyethylene produced according to the process of the invention and corresponding values of samples of the same molecular weight produced under the same conditions but with a catalyst obtained from titanium tetrachloride in place of the bis-cyclopentadienyl compound.

TABLE III

| Molecular Weight | Density, gm./cc.[1] | Density of polyethylene of same molecular weight,[2] gm./cc. |
|---|---|---|
| 27,000 | 0.967 | 0.958 |
| 33,000 | 0.965 | 0.957 |
| 52,000 | 0.959 | 0.953 |

[1] Catalyst: $(C_5H_5)_2TiCl_2$—$Sn(C_4H_9)_4$—$AlCl_3$.
[2] Catalyst: $TiCl$—$Sn(C_4H_9)$—$AlCl_3$ according to Belgian Patent 547,618.

The different types of unsaturation of the polyethylene product, as determined by infrared spectrophotometry, are shown in Table IV.

TABLE IV

| Polyethylene | Number of groups per thousand carbon atoms | | | |
|---|---|---|---|---|
| | $\begin{array}{c}R\phantom{'} \phantom{xx} H \\ \diagdown \phantom{x} \diagup \\ C=C \\ \diagup \phantom{x} \diagdown \\ H \phantom{xx} R'\end{array}$ (trans) | R—CH=CH$_2$ (vinyl) | $\begin{array}{c}R \\ \diagdown \\ C=CH_2 \\ \diagup \\ R\end{array}$ (vinylidene) | —CH$_3$ (methyl) |
| High pressure (A) | 0.07 | 0.08 | 0.3 | >10 |
| High pressure (B) | 0.05–0.1 | 0.07–0.1 | 0.9–1.3 | 20 |
| High pressure (C) | 0.1 | 0.09 | 0.41 | 23 |
| Catalyst formed from alkylaluminum (A) | 0.18 | 0.30 | 0.22 | 3 |
| Catalyst formed from modified alkyl-aluminum (B) | 0.01 | 0.16 | 0.05 | 1–5 |
| Chromium oxide catalyst (A) | 0.03–0.04 | 1.3 | <0.02 | 2 |
| Chromium oxide catalyst (B) | 0.08 | 1.4 |  | 1.5 |
| According to Belgian Patent 547,618 | 0.36 | 0.55 | 0.06 | 1 |
| Product according to the invention, Example V | 0.083 | 0.160 | 0.014 | <0.2 |

Comparison of these values with those of polyethylenes produced by processes known in the prior art shows that the polymer obtained according to this invention is extremely linear and that it is differentiated by a very low content of vinylidene unsaturation. It is thus distinguished from all prior polyethylenes. This perfect linearity, the almost total absence of methyl groups and the low vinylidene content are consonant with a high density of the new polyethylene, which density is higher than those of polymers previously obtained.

These high-density polymers are characterized by a high rigidity, which facilitates the fabrication of articles by injection molding without producing undesirable distortions.

The so-called "sandwich" compounds referred to herein are well known in the art; see, for example, U.S. Patent 2,827,446 (1958), Breslow et al. J. Am. Chem. Soc. 79, 5072–3 (1957), Natta et al., ibid. 79, 2975–6 (1957).

The following is claimed:

1. A process which comprises homopolymerizing ethylene to solid polymer in the presence of a catalyst which forms on commingling bis(dicyclopentadienyl) titanium dichloride, tetrabutyl tin, and aluminum chloride.

2. A process according to claim 1 wherein the catalyst is dissolved in an inert hydrocarbon solvent, the mol ratio of aluminum chloride to tetrabutyl tin is in the range 0.1:1–2:1, the molar ratio of aluminum chloride to bis(cyclopentadienyl) titanium chloride is in the range 1:1 to 5:1, the polymerization temperature is in the range 0 to 100° C. and the polymerization pressure is in the range 1 to 50 atmospheres.

3. A process which comprises polymerizing at least one 1-olefin in the presence of a catalyst which forms on commingling
   (A) a "sandwich" compound selected from the group consisting of bis(cyclopentadienyl) titanium dichloride, bis(cyclopentadienyl) vanadium trichloride, bis(cyclopentadienyl) vanadium oxychloride, and bis(cyclopentadienyl) cobalt;
   (B) a compound selected from the group consisting of tin and lead compounds having the formula $SnR_4$ and $PbR_4$, respectively, wherein R is a hydrocarbon radical selected from the group consisting of alkyl, aryl, and cycloalkyl radicals having from 1 to 10 carbon atoms each; and
   (C) a compound selected from the group consisting of the halides of aluminum and boron.

4. A polymerization catalyst which forms on commingling bis(cyclopentadienyl) titanium dichloride, tetrabutyl tin, and aluminum chloride, the molar ratio of aluminum to tin compound being in the range 0.1:1 to 2:1 and the ratio of aluminum to titanium compound being in the range 1:1 to 5:1.

5. A catalyst which forms on commingling
   (A) a "sandwich" compound selected from the group consisting of bis(cyclopentadienyl) titanium dichloride, bis(cyclopentadienyl) vanadium trichloride, bis(cyclopentadienyl) vanadium oxychloride, and bis(cyclopentadienyl) cobalt.
   (B) a compound having a formula selected from the group $SnR_4$ and $PbR_4$ wherein R signifies a hydrocarbon radical selected from the group consisting of alkyl, aryl and cycloalkyl radicals having from 1 to 10 carbon atoms each; and
   (C) a compound selected from the group consisting of the halides of aluminum and boron.

6. A catalyst according to claim 4 dissolved in an inert hydrocarbon solvent selected from the group consisting of benzene, toluene and the xylenes.

7. A process according to claim 3 wherein said 1-olefins are selected from the group consisting of ethylene, propylene, 1-butene, 1-pentene, and 4-methyl-1-pentene.

References Cited

UNITED STATES PATENTS

| | | | |
|---|---|---|---|
| 3,288,769 | 11/1966 | Cooper et al. | 200—88.2 |
| 3,242,099 | 3/1966 | Manyik et al. | 252—429 |
| 2,970,989 | 2/1961 | Hoxie | 260—94.9 |
| 2,900,374 | 8/1959 | Aries | 260—94.9 |

FOREIGN PATENTS

| | | |
|---|---|---|
| 547,618 | 11/1956 | Belgium. |
| 860,407 | 2/1961 | Great Britain. |
| 875,924 | 8/1961 | Great Britain. |

OTHER REFERENCES

Raff and Allison: Polyethylene, Interscience Publishers, Inc., 1956 (pp 1–4).

JOSEPH L. SCHOFER, *Primary Examiner.*

M. B. KURTZMAN, *Assistant Examiner.*

U.S. Cl. X.R.

260—93.7, 88.2; 252—429